June 26, 1945.   K. L. LANDON   2,379,163
PRODUCING MOLDED PRODUCT
Filed July 24, 1943
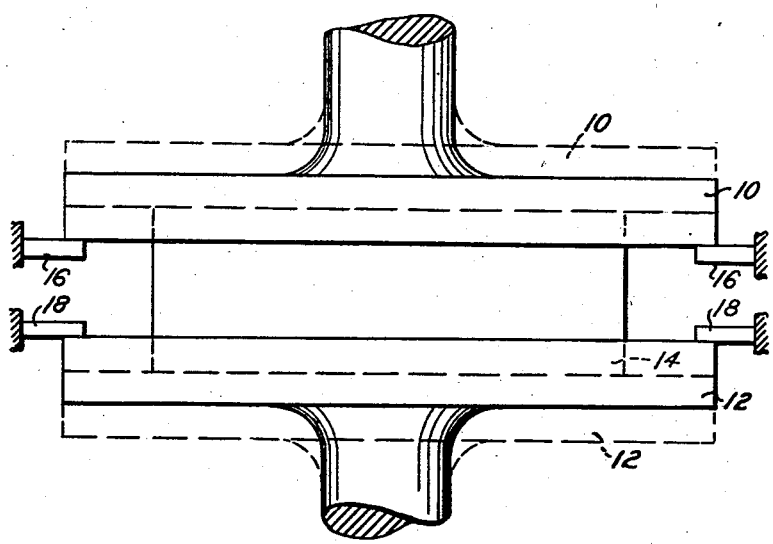
WITNESSES:
INVENTOR
Kenneth L. Landon.
BY
ATTORNEY Patented June 26, 1945

2,379,163

UNITED STATES PATENT OFFICE 2,379,163

PRODUCING MOLDED PRODUCTS

Kenneth L. Landon, Wilkinsburg, Pa., assignor to Westinghouse Electric Corporation, East Pittsburgh, Pa., a corporation of Pennsylvania Application July 24, 1943, Serial No. 495,999

6 Claims. (Cl. 18—47.5)

This invention relates to the molding of plastic articles.

Porous or low-density sheets of fibrous material impregnated with a resinous binder have been produced heretofore. Attempts have been made to utilize such low-density sheets as insulation for refrigerators and the like, but the low-density sheets have such poor moisture resistance that they are unsatisfactory for this purpose. Further, the surface of the sheets do not have sufficient hardness and strength to withstand the wear or other deterioration caused by usage.

Attempts have been made to provide a hard impervious surface for the low-density material, but these have not proven to be practical in commercial use. For example, where surface sheets high in resin content were bonded to the low-density body during the molding cycle, it was found that the bond between the parts was not very good. Likewise, where metal foil was used as the surface sheet, the bond was weak and unsatisfactory. Other attempts required so many additional manufacturing steps as to render them commercially impractical.

An object of this invention is the provision of a method for making a molded product having a low-density core portion protected by high-density surface layers.

Other objects of this invention will become apparent from the following description when taken in conjunction with the accompanying drawing, in which Figure 1 is a fragmentary view in elevation of apparatus utilized in practicing this invention; and Fig. 2 is a view in section of a molded sheet or plate produced in accordance with this invention.

In practicing this invention, a mixture of fibrous pulp and resin is first provided in any of the well-known methods, the stock or furnish of pulp and resin in predetermined ratios being thoroughly agitated to obtain a substantially uniform distribution of the resin in the fibrous pulp. After this is accomplished, the pulp carrying the resin is removed from the furnish by any of the well-known suction methods to deposit a sheet of predetermined size of the pulp having the resin distributed therein while removing the water therefrom. Preferably, the formed sheets of pulp and resin are then heated at a temperature sufficient to remove moisture therefrom without effecting polymerization of the resinous binder carried by the fibers. After the preformed sheets are formed in this manner, they may be employed singly or stacked to any predetermined heighth, depending upon the thickness of the sheet or plate which is to be produced.

Referring to Fig. 1 of the drawing, there is illustrated the platens 10 and 12 of a molding press having, as illustrated by the dotted lines, a quantity 14 of the stacked preformed pulp and resin sheets deposited therebetween. The platens 10 and 12 may be heated in any manner such as by conventional embedded steam pipes (not shown) or the like and are disposed for movement from the position shown in dotted lines towards each other to mold the quantity 14 of pulp and resin to a predetermined size.

In practice, with the quantity 14 of pulp and resin disposed between the platens 10 and 12, the platens are heated to a molding temperature and when thus heated a substantially high pressure in excess of 1000 pounds per square inch and up to 2200 pounds per square inch is applied to the platens to compact the quantity 14 of fibers carrying the resin to the predetermined size as shown by the solid lines, stops 16 and 18 being associated with the platens 10 and 12, respectively, to limit the movement of the platens toward each other to the predetermined size or thickness of the article which is to be produced. When the heat and pressure is thus applied to the quantity 14 of pulp and resin, it is found that since the pulp has a low thermal conductivity that the heat flow through the quantity 14 is extremely slow and that the resinous binder of the quantity 14 adjacent each of the platens 10 and 12 is so heated as to effect a flow thereof, this flow permitting the compacting of the fibers of the surface layers adjacent the platens 10 and 12.

The high-pressure is applied only for a relatively short time depending upon the thickness of the compacted surface layers which it is desired to produce on the article and only for that length of time necessary in compressing the quantity 14 to the predetermined size of the required article, as determined by the position of the stops 16 and 18 and maintaining the fibers of the surface layers compacted until the resin carried thereby is cured. With the platens 10 and 12 seating against the stops 16 and 18, it is found that the pressure and heat applied for this short period of time is sufficient to effect the curing of the resinous binder in the surface layers adjacent the platens and the resinous binder functions to bind the fibers of the surface layers while they are compressed.

At the same time that the fibers of the surface layers adjacent the platens 10 and 12 are compacted, as described hereinbefore, the fibers of the intermediate layer between the surface layers are not compacted to the same degree as those of the surface layers. This is because the heat has not completely penetrated the body of fibers and resin with the result that the resinous binder of the intermediate layer does not flow during this step in the process and the fibers are consequently not compacted to the same degree as those of the surface layers.

With the platens 10 and 12 seating against the stops 16 and 18 and the resin of the surface layers polymerized, the pressure is reduced to a substantially lower pressure of between 300 pounds per square inch and 700 pounds per square inch while maintaining the molding temperature. This reduced pressure will vary somewhat, it being only necessary to utilize sufficient pressure to maintain the compressed quantity 14 of pulp and resin to the required predetermined size while the heat applied penetrates the body of fibers and resin to effect the polymerization of the resinous binder. The time of the application of the reduced pressure and molding temperature will vary as will be understood, depending upon the thickness of the quantity of compressed fibers and the type of resin employed.

Although the heat penetrates the entire body of the fibers and resin during the last-described molding operation, it will be apparent that since the stops 16 and 18 limit the movement of the platens 10 and 12 toward each other, no further compression of the intermediate layer of fibers between the cured surface layers will be obtained since the pressure is limited with the result that under the heat applied, the resin of the intermediate layer flows to bond the fibers of the intermediate layer. This results in a porous or low-density intermediate layer disposed between and bonded to the high-density or more solidly compacted surface layers.

Referring to Fig. 2, there is illustrated a sheet 20 of molded fibers having a low-density core portion 22 and high-density surface layers 24 and 26 bonded thereto. As clearly evident, the fibers of the surface layers 24 and 26 are more highly compacted than are the fibers of the intermediate layer 22. As a specific example of a typical one-inch sheet or board 20 produced from kraft pulp and phenolic resin in accordance with this invention, it was found that each of the surface layers 24 and 26 of high-density material had a thickness of $\frac{1}{16}$ inch, together with a density of 1.08, whereas the interior or intermediate layer 22 had a low-density of 0.75. This sheet was molded at a temperature of between 170° C. and 185° C., the molding temperature range for phenolic resin, the specific temperature used being 175° C. The mechanical strength of such boards or sheets is quite good and the surface of the boards are quite smooth. Further, the boards produced in accordance with this invention have very good moisture absorption, the surface layers protecting the porous or low-density intermediate layer.

By practicing this invention, molded sheets are produced having high-density surface layers and a porous or low-density interior layer which are quite satisfactory for use in refrigerator cabinets. This is because the high-density surface layers impart to the molded product a surface hardness, whereas the porous interior layer has exceptionally good thermal insulation. The method utilized in producing the sheets can be practiced without additional equipment over that needed for normal molding operations without necessitating the use of additional manufacturing steps such as would render the method commercially impractical. Further, this invention may be practiced with any fibrous material and resinous binder which can be so agitated that the preformed uncured fibrous sheets carry a substantially uniform distribution of the resinous binder, the resinous binder being present in a predetermined ratio with respect to the fibrous material.

Although this invention has been described with reference to a particular embodiment thereof, it is, of course, not to be limited thereto except insofar as is necessitated by the scope of the appended claims.

I claim as my invention:

1. The method of producing a molded product comprising, in combination, subjecting a predetermined quantity of fibrous material and a heat curable resinous binder carried thereby to a pressure not lower than 1000 pounds per square inch at a molding temperature for a relatively short period of time to reduce the quantity of the fibrous material and binder to a predetermined thickness and to compact the surface layers to a high density while effecting the curing of the resinous binder carried therein leaving an intermediate low density layer of impregnated fibrous material therebetween, reducing the pressure sufficiently to prevent further compaction of the low density intermediate layer, but maintaining sufficient pressure to retain said predetermined thickness, and maintaining the fibrous material under the reduced pressure at the molding temperature for a sufficient period of time to effect the curing of the resin carried by the fibrous material disposed between the compacted cured surface layers whereby to produce a low-density layer of impregnated fibrous material between the high-density surface layers, the low-density layer being integrally bonded to the high-density surface layers.

2. The method of producing a molded product comprising, in combination, subjecting a predetermined quantity of fibrous material and a heat curable resinous binder carried thereby to a pressure not lower than 1000 pounds per square inch at a molding temperature for a relatively short period of time to reduce the quantity of the fibrous material and binder to a predetermined thickness and to compact the surface layers to a high density while effecting the curing of the resinous binder carried therein leaving an intermediate low density layer of impregnated fibrous material therebetween, reducing the pressure to between 300 pounds per square inch and 700 pounds per square inch while maintaining the predetermined thickness, and maintaining the fibrous material under the reduced pressure at the molding temperature for a sufficient period of time to effect the curing of the resin carried by the fibrous material disposed between the compacted cured surface layers whereby to produce a low-density layer of impregnated fibrous material between the high-density surface layers, the low-density layer being integrally bonded to the high-density surface layers.

3. The method of producing a molded product comprising, in combination, subjecting a predetermined quantity of fibrous material and a heat curable resinous binder carried thereby to a pressure of between 1000 and 2200 pounds per square inch at a molding temperature of between 170° C.

and 185° C. for a relatively short period of time to reduce the quantity of the fibrous material and binder to a predetermined thickness and to compact the surface layers to a high density while effecting the curing of the resinous binder carried therein leaving an intermediate low density layer of impregnated fibrous material therebetween, reducing the pressure sufficiently to prevent further compaction of the low density intermediate layer, but maintaining sufficient pressure to retain said predetermined thickness, and maintaining the fibrous material under the reduced pressure at the molding temperature for a sufficient period of time to effect the curing of the resin carried by the fibrous material disposed between the compacted cured surface layers whereby to produce a low-density layer of impregnated fibrous material between the high density surface layers, the low-density layer being integrally bonded to the high-density surface layers.

4. The method of producing a molded product comprising, in combination, subjecting a predetermined quantity of fibrous material and a heat curable resinous binder carried thereby to a pressure above 1000 pounds per square inch at a molding temperature between 170° C. and 185° C. for a period of time of about 5 minutes to reduce the quantity of the fibrous material and binder to a predetermined thickness, the pressure and heat thus applied effecting a compacting of the fibers of the surface layers and the curing of the resinous binder carried thereby to give high density surface layers, reducing the pressure to between 300 pounds per square inch and 700 pounds per square inch while maintaining the predetermined thickness, and maintaining the fibrous material under the reduced pressure at the molding temperature for a sufficient period of time to effect the curing of the resin carried by the fibrous material disposed between the compacted cured surface layers whereby to produce a low-density layer of impregnated fibrous material between the high-density surface layers, the low-density layer being integrally bonded to the high-density surface layers.

5. The method of producing a molded product comprising, in combination, subjecting a predetermined quantity of fibrous pulp and a heat curable resinous binder carried thereby to a pressure not lower than 1000 pounds per square inch at a molding temperature for a relatively short period of time to reduce the quantity of the fibrous material and binder to a predetermined thickness and to compact the surface layers to a high density while effecting the curing of the resinous binder carried therein leaving an intermediate low density layer of impregnated fibrous pulp therebetween, reducing the pressure sufficiently to prevent further compaction of the low density intermediate layer but maintaining sufficient pressure to retain said predetermined thickness, and maintaining the fibrous pulp under the reduced pressure at the molding temperature for a sufficient period of time to effect the curing of the resin carried by the fibrous material disposed between the compacted cured surface layers whereby to produce a low-density porous layer of impregnated fibrous material between the high-density surface layers, the low-density layer being integrally bonded to the high-density surface layers.

6. The method of producing a molded product comprising, in combination, subjecting a predetermined quantity of fibrous material and a heat curable resinous binder carried thereby to a pressure not lower than 1000 pounds per square inch at a molding temperature for a relatively short period of time to reduce the quantity of the fibrous material and binder to a predetermined thickness and to compact the surface layers to a high density while effecting the curing of the resinous binder carried therein leaving an intermediate low density layer of impregnated fibrous material therebetween, reducing the pressure to below 700 pounds per square inch, but maintaining the reduced pressure sufficiently high to retain said predetermined thickness, and maintaining the fibrous material under the reduced pressure at the molding temperature for a sufficient period of time to effect the curing of the resin carried by the fibrous material disposed between the compacted surface layers, the low density layer being integrally bonded to the high density surface layers.

KENNETH L. LANDON.